United States Patent
Suzuki et al.

(10) Patent No.: US 11,187,956 B2
(45) Date of Patent: Nov. 30, 2021

(54) ELECTROCHROMIC ELEMENT AND ELECTROCHROMIC DEVICE

(71) Applicant: Panasonic Intellectual Property Management Co., Ltd., Osaka (JP)

(72) Inventors: Takashi Suzuki, Osaka (JP); Shotaro Ogawa, Osaka (JP); Makoto Morita, Hyogo (JP); Akira Shiokawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 130 days.

(21) Appl. No.: 16/136,922

(22) Filed: Sep. 20, 2018

(65) Prior Publication Data

US 2019/0018296 A1    Jan. 17, 2019

Related U.S. Application Data

(63) Continuation of application No. PCT/JP2016/004715, filed on Oct. 27, 2016.

(30) Foreign Application Priority Data

Mar. 25, 2016 (JP) .................. 2016-061040

(51) Int. Cl.
*G02F 1/15* (2019.01)
*G02F 1/03* (2006.01)
(Continued)

(52) U.S. Cl.
CPC ............ *G02F 1/155* (2013.01); *G02F 1/1506* (2013.01); *G02F 1/1525* (2013.01); *G02F 1/163* (2013.01); *G02F 2001/1555* (2013.01)

(58) Field of Classification Search
CPC .......... G02F 1/0316; G02F 3/16; G02F 1/163; G02F 1/155; G02F 1/1523; G02F 1/1525;
(Continued)

(56) References Cited

U.S. PATENT DOCUMENTS

| 5,903,382 | A | * | 5/1999 | Tench | ................... G02F 1/1506 359/265 |
| 2004/0061919 | A1 | * | 4/2004 | Tench | ................... G02F 1/1506 359/265 |

(Continued)

FOREIGN PATENT DOCUMENTS

| JP | 2004-271717 | 9/2004 |
| JP | 2010-78837 | 4/2010 |

(Continued)

OTHER PUBLICATIONS

International Search Report (ISR) dated Jan. 24, 2017 in International (PCT) Application No. PCT/JP2016/004715.

*Primary Examiner* — Dawayne Pinkney
(74) *Attorney, Agent, or Firm* — Wenderoth, Lind & Ponack, L.L.P.

(57) ABSTRACT

An electrochromic element includes: a first electrode which transmits light; a second electrode disposed opposite the first electrode; and an electrolyte containing metal and located between the first electrode and the second electrode. The metal is depositable on one of the first electrode and the second electrode, according to a voltage applied between the first electrode and the second electrode, and a second deposition voltage at which deposition of the metal on the second electrode starts is higher than a first deposition voltage at which deposition of the metal on the first electrode starts.

4 Claims, 8 Drawing Sheets

(51) Int. Cl.
*G09G 3/19* (2006.01)
*G09G 3/38* (2006.01)
*H04N 9/16* (2006.01)
*G02F 1/155* (2006.01)
*G02F 1/1506* (2019.01)
*G02F 1/1523* (2019.01)
*G02F 1/163* (2006.01)

(58) Field of Classification Search
CPC ........ G02F 1/1521; G02F 1/1533; G02F 1/03; C09K 9/02; B60R 1/088; H04N 9/3137; H04N 9/22
USPC ........... 359/265–277, 245–247, 242; 345/49, 345/105; 250/70; 348/817; 438/929
See application file for complete search history.

(56) References Cited

U.S. PATENT DOCUMENTS

| | | | |
|---|---|---|---|
| 2006/0151803 A1* | 7/2006 | Wesner | C25B 11/091 257/103 |
| 2006/0152474 A1 | 7/2006 | Saito et al. | |
| 2007/0064303 A1* | 3/2007 | Schumacher | G04F 13/04 359/297 |
| 2007/0221958 A1* | 9/2007 | Aoki | H01L 51/0096 257/211 |
| 2008/0055831 A1 | 3/2008 | Satoh | |
| 2010/0072070 A1 | 3/2010 | Ikeda | |
| 2014/0218781 A1 | 8/2014 | Kobayashi et al. | |
| 2016/0033837 A1* | 2/2016 | Bjornard | G02F 1/153 359/265 |
| 2016/0291437 A1 | 10/2016 | Ogawa et al. | |
| 2019/0025665 A1* | 1/2019 | Cho | G02F 1/19 |

FOREIGN PATENT DOCUMENTS

| | | |
|---|---|---|
| JP | 2015-148825 | 8/2015 |
| WO | 2006/090434 | 8/2006 |
| WO | 2016/021190 | 2/2016 |

* cited by examiner

ELECTROCHROMIC ELEMENT AND ELECTROCHROMIC DEVICE

CROSS REFERENCE TO RELATED APPLICATIONS

This application is a U.S. continuation application of PCT International Patent Application Number PCT/JP2016/004715 filed on Oct. 27, 2016, claiming the benefit of priority of Japanese Patent Application Number 2016-061040 filed on Mar. 25, 2016, the entire contents of which are hereby incorporated by reference.

BACKGROUND

1. Technical Field

The present disclosure relates to an electrochromic element and an electrochromic device.

2. Description of the Related Art

Conventionally, electrochromic elements and electrochromic devices which can repeatedly switch between a transparent state and a reflective (light-shielding) state, by repeatedly depositing and dissolving metal have been disclosed as in WO 2016/021190.

SUMMARY

The present disclosure provides an electrochromic element and an electrochromic device which can efficiently deposit and dissolve metal.

An electrochromic element according to the present disclosure includes: a first electrode which transmits light; a second electrode disposed opposite the first electrode; and an electrolyte containing metal and located between the first electrode and the second electrode. The metal is depositable on one of the first electrode and the second electrode, according to a voltage applied between the first electrode and the second electrode, and a second deposition voltage at which deposition of the metal on the second electrode starts is higher than a first deposition voltage at which deposition of the metal on the first electrode starts.

An electrochromic device according to the present disclosure includes: the electrochromic element; and a driver which applies a voltage between the first electrode and the second electrode.

An electrochromic element and an electrochromic device according to the present disclosure can efficiently deposit and dissolve metal.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
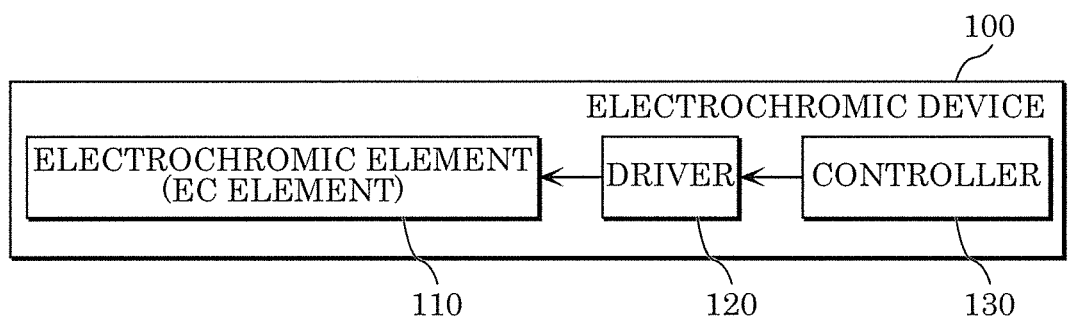
FIG. 1 is a block diagram illustrating an electrochromic device according to an embodiment.

The following describes embodiments in detail with reference to the drawings as appropriate. However, an excessively detailed description may be omitted. For example, a detailed description of a matter already known well and a redundant description of substantially the same configuration may be omitted. This is intended to avoid making the following description unnecessarily redundant and to facilitate understanding of persons skilled in the art.

Note that the inventors provide the accompanying drawings and the following description in order that a person skilled in the art sufficiently understands the present disclosure, and do not intend to limit the subject matter of the claims by the drawings and the description. Thus, the embodiments described below each show a specific example of the present disclosure. The numerical values, shapes, materials, elements, the arrangement and connection of the elements, and the like described in the following embodiments are examples, and thus are not intended to limit the present disclosure. Therefore, among the elements in the following embodiments, elements not recited in any of the independent claims are described as arbitrary elements.

Note that the diagrams are schematic diagrams, and do not necessarily provide strict illustration. Accordingly, for example, scales are not necessarily the same in the drawings. In addition, the same numeral is given to a substantially same configuration throughout the drawings, and a redundant description thereof may be omitted or simplified.

Embodiment

The following describes embodiments, with reference to the drawings.

[1. Configuration]

FIG. 1 is a block diagram illustrating electrochromic device 100 according to the present embodiment.

As illustrated in FIG. 1, electrochromic device (hereafter, referred to as EC device) 100 includes electrochromic element (hereafter, referred to as EC element) 110, driver 120 which drives EC element 110, and controller 130 which controls driver 120.

EC element 110 has an optical state which can change according to an applied electric field. Specifically, in EC device 100, driver 120 applies an electric field to EC element 110, whereby the optical state of EC element 110 is changed. Examples of the optical state include a transparent state in which light (visible light) is allowed to pass through, and a light-shielding state in which light is shielded (not allowed to pass through). In the present embodiment, EC element 110 can achieve the transparent state, and a reflective state in which light is reflected as examples of the light-shielding state. The reflection in the reflective state is specular reflection, but may be scatter reflection.

Note that the examples of the optical state may include a scattering state in which light is scattered, and an absorbing state in which light is absorbed, for instance. The examples of the optical state may further include a color control state in which the wavelength (color) of light allowed to pass through or reflected is changed. EC device 100 according to the present embodiment switches the optical state of EC element 110 between the transparent state and the reflective state, for example, by controlling the electric field applied to EC element 110.

Figure 2:
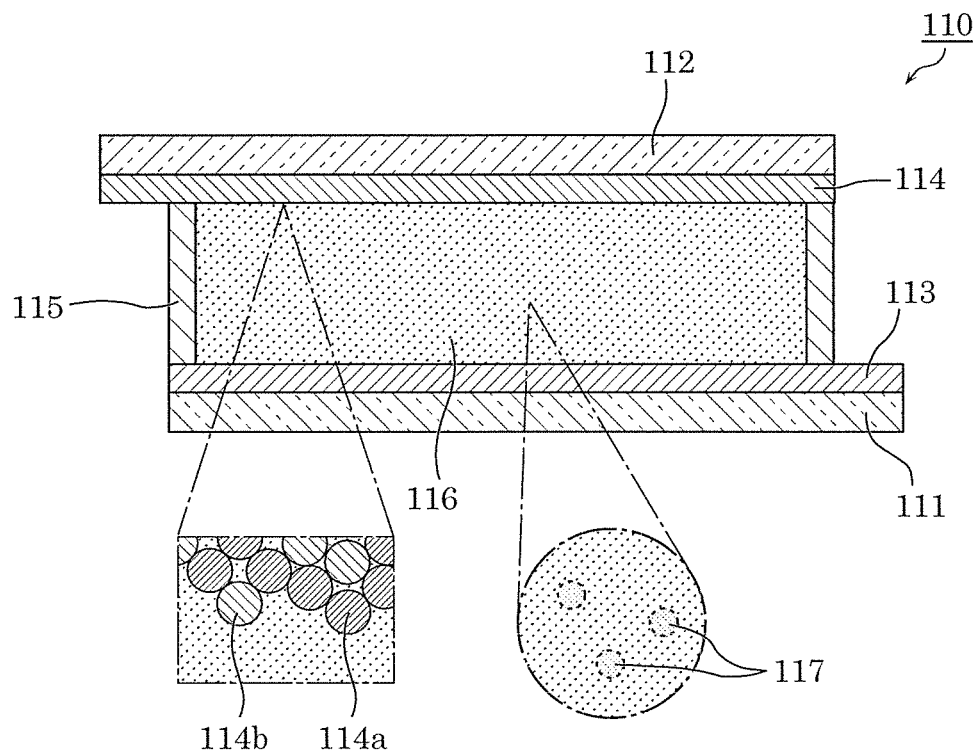
FIG. 2 is a cross-sectional view of an electrochromic element according to the embodiment.

FIG. 2 is a cross-sectional view of EC element 110 according to the present embodiment. As illustrated in FIG. 2, EC element 110 includes first substrate 111, second substrate 112, first electrode 113, second electrode 114, spacer 115, and electrolyte 116. As schematically illustrated in FIG. 2, electrolyte 116 contains metal 117.

First electrode (transparent electrode) 113 is formed on a principal surface of first substrate 111 which faces second substrate 112. Second electrode (counter electrode) 114 is formed on a principal surface of second substrate 112 which faces first substrate 111. Specifically, first substrate 111 and second substrate 112 are disposed such that first electrode 113 and second electrode 114 face each other. In the present embodiment, the spacing between first electrode 113 and second electrode 114 is 0.2 mm, for example, but the present disclosure is not limited thereto, and the spacing may be changed as appropriate.

Spacer 115 is disposed between first electrode 113 and second electrode 114. Spacer 115 forms a flat plate-like space together with first electrode 113 and second electrode 114. The space is filled with electrolyte 116.

First substrate 111 and second substrate 112 are formed using insulating material such as glass or resin. First substrate 111 and second substrate 112 are light-transmitting boards, for example, and disposed opposite each other. The shapes of first substrate 111 and second substrate 112 in a plan view are, for example, quadrilateral, but the present disclosure is not limited thereto, and the shapes may each be a shape that includes a curve, such as a round shape.

First electrode 113 is a light-transmitting conducting film. First electrode 113 is a transparent electrode such as an indium tin oxide (ITO) electrode, for example. First electrode 113 is disposed on first substrate 111.

Second electrode 114 is a counter electrode disposed opposite first electrode 113. In the present embodiment, second electrode 114 is a light-transmitting conducting film. Second electrode 114 is a transparent electrode such as an ITO electrode, for example. Accordingly, second electrode 114 is formed using the same material as that of first electrode 113.

A portion of first electrode 113 and a portion of second electrode 114 (specifically, portions that project further outward than spacer 115) are exposed outside of spacer 115, without contacting electrolyte 116. In the present embodiment, driver 120 is connected to the exposed portions of first electrode 113 and second electrode 114 via lead wires (see FIG. 3). Accordingly, a voltage is applied between first electrode 113 and second electrode 114, and an electric field can be applied to electrolyte 116.

In the present embodiment, second electrode 114 has a surface rougher than a surface of first electrode 113. Specifically, the surface of second electrode 114 (the principal surface which faces first electrode 113) is roughened. Accordingly, second electrode 114 has an electric resistance (sheet resistance) higher than that of first electrode 113. The charge exchange of second electrode 114 is less efficient than the charge exchange of first electrode 113. Specifically, electron transfer does not readily occur between second electrode 114 and metal 117, and deposition reaction of metal 117 does not readily occur. On the other hand, electron transfer readily occur between first electrode 113 and metal 117, and deposition and dissolution reactions of metal 117 readily occur.

In the present embodiment, as schematically illustrated in FIG. 2, the surface of second electrode 114 includes crystal fine particles 114a and particulate nonconductors 114b. Note that nonconductors 114b may not be included. The details are later described.

Spacer 115 connects the edges of first electrode 113 and second electrode 114 to each other, such that the exposed portions (terminal portions) of first electrode 113 and second electrode 114 are located on the outside of spacer 115. Specifically, spacer 115 is annularly disposed along the perimeter of the overlapping portion of first electrode 113 and second electrode 114 in a plan view. Spacer 115 is formed by annularly applying a resin material such as a thermosetting resin, and hardening the resin material, for example.

Electrolyte 116 is a solution located between first electrode 113 and second electrode 114, and containing metal 117. Metal 117 is present in electrolyte 116 as metal ions. Electrolyte 116 is a solution which contains, as metal 117, silver ions which are to be deposited on first electrode 113, for example.

Note that electrolyte 116 may also contain other metal ions as metal 117, other than silver ions. Metal 117 can be deposited on first electrode 113 or second electrode 114, according to a voltage applied between first electrode 113 and second electrode 114. Details will be later described.

Metal 117 is a noble metal, for example, and is specifically, silver, gold, platinum, or palladium, for instance, yet metal 117 is not limited thereto. Metal 117 may be copper. Metal such as a noble metal that has ionization tendency less than hydrogen is used as metal 117, so that metal 117 can be stably deposited as thin metal film 118 (see FIG. 3) when an electric field is applied.

Note that electrolyte 116 includes a solvent, for instance, in addition to an electrochromic material including metal 117.

Note that a user is assumed to look at EC element 110 from the first substrate 111 side in the present embodiment. Accordingly, second substrate 112 and second electrode 114 may be opaque. For example, second substrate 112 may be a silicon substrate, for instance, and second electrode 114 may be a metal electrode such as a copper electrode.

In addition, the material described in WO 2016/021190 may be used as it is, as the material of EC element 110, for instance.

Driver 120 is a power supply for applying a voltage between first electrode 113 and second electrode 114 of EC element 110. Driver 120 is connected to first electrode 113 and second electrode 114 via lead wires (see FIG. 3).

Driver 120 can change the polarity and magnitude of an applied voltage, based on the control by controller 130. For example, driver 120 controls a timing at which a voltage is applied and the magnitude of the applied voltage, based on a control signal received from controller 130.

Driver 120 generates a pulsed undulating voltage (direct current voltage), based on, for example, power supplied from an external power supply such as a commercial power supply, and applies the voltage between first electrode 113 and second electrode 114. Note that driver 120 may apply an alternating current voltage.

Controller 130 is a microcomputer (microcontroller), for instance, which controls driver 120. Controller 130 is connected to driver 120 in a wired or wireless manner. Controller 130 transmits, to driver 120, a control signal for controlling a timing at which an applied voltage is to be changed and the magnitude of the applied voltage.

[2. Operation]

Figure 3:
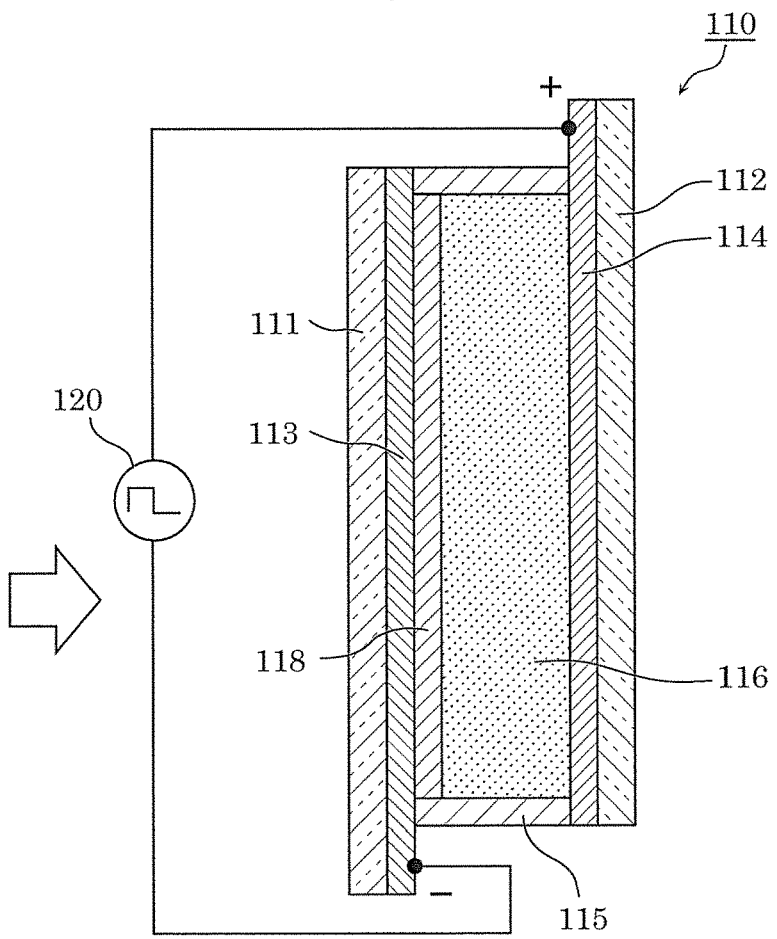
FIG. 3 is a diagram for illustrating a principle of the electrochromic device according to the embodiment.

Operation of EC device 100 having the above configuration is described with reference to FIG. 3. FIG. 3 is a diagram for illustrating the principle of EC device 100 according to the present embodiment.

EC device 100 according to the present embodiment can change the optical state of EC element 110, and maintain the changed optical state.

[2-1. Reflective State]

First, the operation for changing the optical state of EC element 110 from the transparent state to the reflective state is to be described. Specifically, driver 120 applies, to EC element 110, an electric field from second electrode 114 to first electrode 113. Thus, driver 120 applies a voltage between first electrode 113 and second electrode 114 so that first electrode 113 is a cathode (at low potential), and second electrode 114 is an anode (at high potential).

As a result, metal 117 (specifically, silver ions) in electrolyte 116 is deposited on the surface of first electrode 113, and thin metal film 118 is formed on the surface of first electrode 113, as illustrated in FIG. 3. Thin metal film 118 is obtained by metal 117 contained in electrolyte 116 being deposited into a film, and is a silver film, for example.

In this specification, a voltage applied between first electrode 113 and second electrode 114 to deposit metal 117 on the surface of first electrode 113 is referred to as a "first voltage". Thus, driver 120 applies the first voltage between first electrode 113 and second electrode 114 to deposit metal 117 on first electrode 113. The first voltage is applied so that the electric potential at second electrode 114 is higher than the electric potential at first electrode 113. The absolute value of the first voltage is greater than or equal to a first deposition voltage at which deposition of metal 117 on first electrode 113 starts. Note that the absolute value of the first voltage is indicated by the effective value of the first voltage when the first voltage is an undulating voltage or an alternating current voltage, for example.

When a user looks at EC element 110 from the first substrate 111 side (in the outline arrow direction illustrated in FIG. 3), thin metal film 118 reflects light, so that EC element 110 functions as a mirror (in the reflective state). Note that when a material which does not reflect light is used as metal 117, thin metal film 118 functions as a light-shielding material (in the light-shielding state).

Note that in order to maintain the reflective state (or light-shielding state), driver 120 maintains an electric field applied to EC element 110 as it is when the transparent state is changed to the reflective state. For example, driver 120 applies a voltage (namely, the first voltage) so that first electrode 113 is a cathode and second electrode 114 is an anode.

[2-2. Transparent State]

The following describes an operation for changing the optical state of EC element 110 from the reflective state to the transparent state. Specifically, the state of EC element 110 is brought back to the original state (transparent state) in which thin metal film 118 is not included, by dissolving metal 117 (thin metal film 118) deposited on the surface of first electrode 113.

For example, driver 120 stops applying a voltage between first electrode 113 and second electrode 114, so as to bring EC element 110 into a floating state. However, it takes a long time period to completely dissolve and eliminate thin metal film 118.

In view of this, in order to switch the reflective state to the transparent state in a shorter time period, or in other words, in order to more quickly dissolve thin metal film 118, an electric field having a polarity reverse to the direction in which metal 117 is deposited, that is, an electric field from first electrode 113 to second electrode 114 may be applied to EC element 110. Specifically, driver 120 applies a voltage between first electrode 113 and second electrode 114 so that first electrode 113 is an anode (at high potential) and second electrode 114 is a cathode (at low potential).

In this specification, a voltage applied between first electrode 113 and second electrode 114 to dissolve metal 117 (thin metal film 118) deposited on the surface of first electrode 113 is referred to as "second voltage". Thus, driver 120 applies the second voltage between first electrode 113 and second electrode 114 to dissolve metal 117 deposited on first electrode 113. The second voltage is applied so that the electric potential at first electrode 113 is higher than the electric potential at second electrode 114. Accordingly the second voltage has a polarity reverse to the polarity of the first voltage.

Here, if an electric field from first electrode 113 to second electrode 114 is applied, the speed of the dissolution of thin metal film 118 is increased so that the reflective state can be switched to the transparent state in a short time period. However, thin metal film 118 may be formed on second electrode 114. In the case where thin metal film 118 is formed on second electrode 114, if metal 117 is to be deposited on first electrode 113, the speed at which thin metal film 118 is formed on first electrode 113 is slower than the speed when thin metal film 118 is not formed on second electrode 114.

Accordingly, when thin metal film 118 is dissolved by applying an electric field, thin metal film 118 is inhibited from being readily formed on the surface of second electrode 114. Specifically, driver 120 sets the absolute value of the second voltage to a value less than a second deposition voltage at which deposition of metal 117 on second electrode 114 starts. Accordingly, when thin metal film 118 is to be again formed on the surface of first electrode 113, the speed at which thin metal film 118 is formed can be maintained.

Note that driver 120 maintains the electric field applied to EC element 110 when the reflective state is changed to the transparent state as it is, in order to maintain the transparent state. For example, driver 120 applies a voltage (namely, the second voltage) so that first electrode 113 is a cathode and second electrode 114 is an anode. The absolute value of the voltage applied at this time is less than the second deposition voltage.

[3. Difference Between First Electrode and Second Electrode]

In the present embodiment, a voltage (deposition voltage) at which deposition of metal 117 on first electrode 113 starts and a voltage (deposition voltage) at which deposition of metal 117 on second electrode 114 starts are different. Specifically, the first deposition voltage at which deposition of metal 117 on first electrode 113 starts is lower than the second deposition voltage at which deposition of metal 117 on second electrode 114 starts.

Note that the first deposition voltage has the minimum absolute value of a voltage (namely, the first voltage) which is applied so that first electrode 113 is an anode and second electrode 114 is a cathode, thus allowing metal 117 to be deposited. The second deposition voltage has the minimum absolute value of a voltage (namely, the second voltage) applied so that first electrode 113 is a cathode and second electrode 114 is an anode, thus allowing metal 117 to be dissolved.

The second deposition voltage is higher than the first deposition voltage, and thus the absolute value of the second voltage for dissolving deposited metal 117 can be set to a value greater than the absolute value of the first voltage for depositing metal 117. For example, driver 120 applies, between first electrode 113 and second electrode 114, the second voltage which has an absolute value greater than the first voltage and is lower than the second deposition voltage. Since the second voltage is lower than the second deposition voltage, metal 117 is not deposited on the surface of second electrode 114.

The second voltage has an absolute value greater than the absolute value of the first voltage, and thus the speed of dissolution of metal 117 can be increased. Accordingly, metal 117 is more efficiently deposited on and dissolved from (thin metal film 118 is more efficiently formed on and eliminated from) first electrode 113 than on/from second electrode 114. Accordingly, the optical states of EC element 110 can be efficiently switched.

This point is to be described in detail with reference to FIGS. 4 to 11. A potential difference between the first deposition voltage and the second deposition voltage can be changed by, for example, changing at least one of surface roughness of the electrodes, a pattern of the electrodes, and the temperature, for instance.

[3-1. Surface Roughness]

[3-1-1. Relation Between Surface Roughness and Characteristics of EC Element]

First, surface roughness is to be described with reference to FIGS. 4 to 7.

Figure 4:
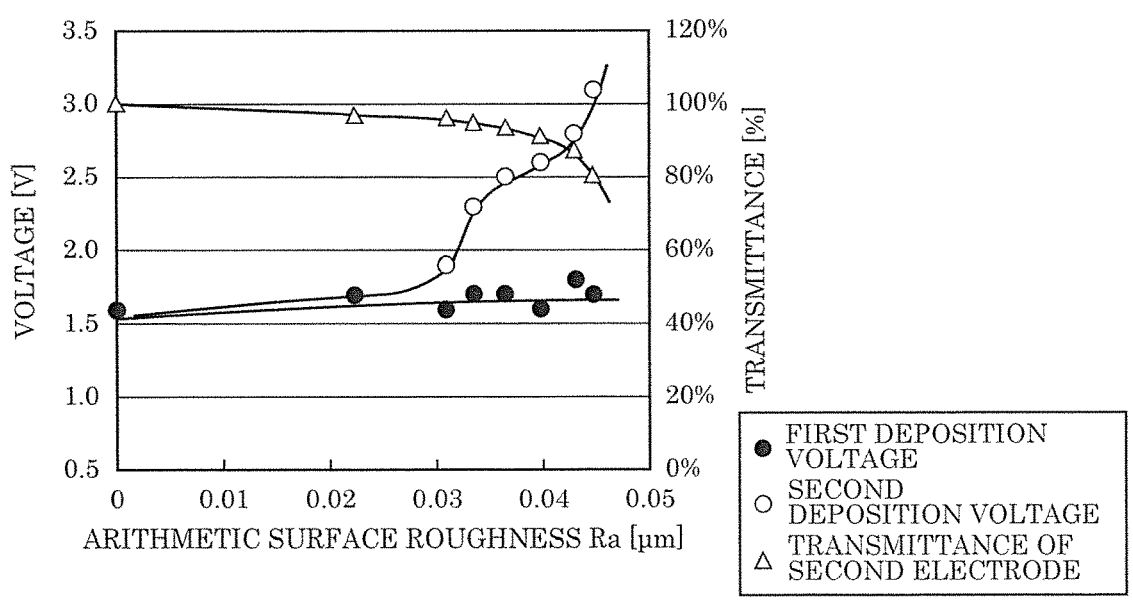
FIG. 4 is a correlation diagram illustrating a relation of surface roughness of a second electrode of the electrochromic element according to the embodiment with respect to a deposition voltage and a transmittance.

FIG. 4 is a correlation diagram illustrating a relation of surface roughness of second electrode 114 in EC element 110 according to the present embodiment with respect to a deposition voltage and a transmittance.

Here, the roughness of the surface of second electrode 114 is changed, and the roughness of the surface of first electrode 113 is not changed. Specifically, a surface treatment is not performed on a conducting film deposited as first electrode 113, but is performed on a conducting film deposited as second electrode 114, thus roughening the surface of second electrode 114.

At this time, a particulate substance such as conductive crystal fine particles 114a is used, as a specific method of roughening the surface. For example, a solvent in which crystal fine particles 114a of the same material as that of the conducting film deposited as second electrode 114 are mixed and stirred is applied onto the surface (principal surface in contact with electrolyte 116) of the conducting film such that the thickness is substantially equal on the surface, and dried so as to be stuck onto the surface, thus creating second electrode 114. Here, the same ITO as that of second electrode 114 is used as the material of crystal fine particles 114a. In addition, crystal fine particles 114a have an average particle diameter of about 100 mu. Metal 117 contained in electrolyte 116 is silver (silver ions).

In FIG. 4, the horizontal axis represents arithmetic surface roughness Ra [μm] of second electrode 114, whereas the vertical axes represent a voltage [V] and transmittance [%]. Note that Ra=0 when the surface is not roughened. Accordingly, arithmetic surface roughness Ra [μm] of first electrode 113 is 0.

At this time, as can be seen from FIG. 4, the first deposition voltage to be applied to deposit silver on the surface of first electrode 113 merely varies in a range from 1.6 V to 1.8 V, and thus is not influenced by the arithmetic surface roughness of second electrode 114.

Furthermore, it can also be seen that the greater arithmetic surface roughness Ra is, the higher the second deposition voltage is. Specifically, the second deposition voltage abruptly increases when Ra is 0.03 μm or greater.

The transmittance of second electrode 114 illustrated in FIG. 4 is indicated in percentage, assuming that the transmittance of second electrode 114 whose surface is not yet roughened is 100%. As can be seen from FIG. 4, the greater the arithmetic surface roughness is, the lower the transmittance of second electrode 114 is. For example, the transmittance of second electrode 114 abruptly decreases when Ra is 0.04 μm or higher.

As described above, it can be seen that when the surface roughness of second electrode 114 is great, the second deposition voltage is high. Accordingly, a high second voltage can be applied to dissolve deposited metal 117. Accordingly, while inhibiting deposition of metal 117 on second electrode 114, thin metal film 118 can be dissolved in a short time period, and the reflective state can be changed to the transparent state.

Figure 5:
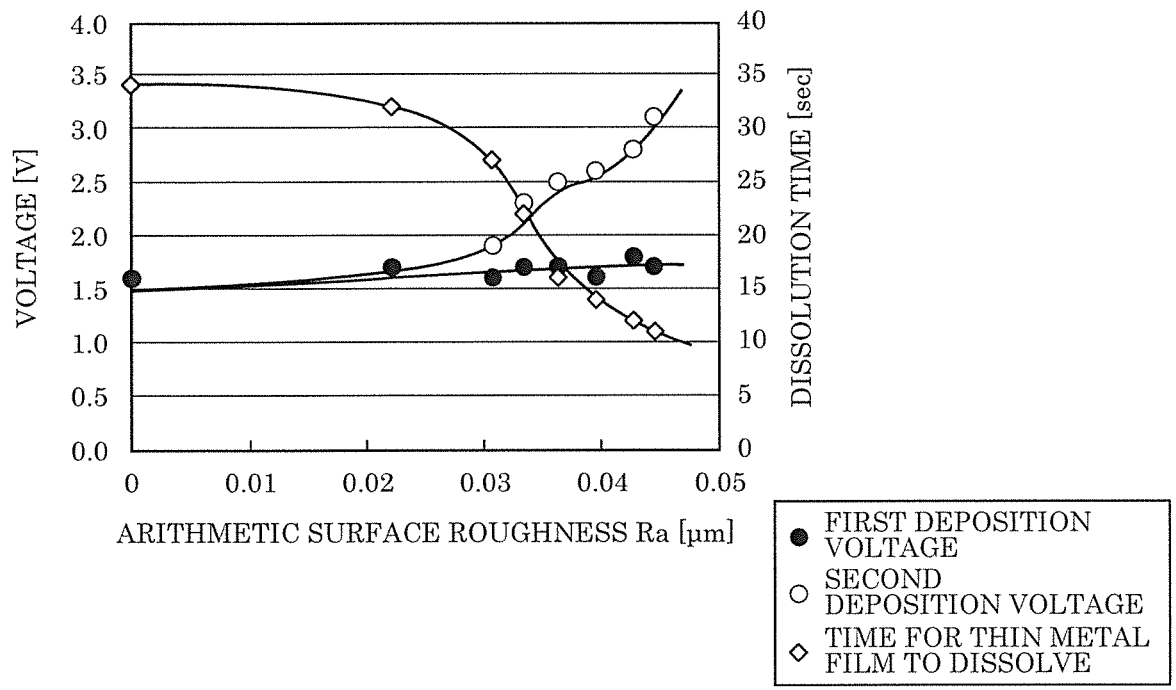
FIG. 5 is a correlation diagram illustrating a relation of surface roughness of the second electrode of the electrochromic element according to the embodiment with respect to a deposition voltage and a dissolution time.

The following describes a dissolution time (elimination time) for thin metal film 118 formed on first electrode 113 to dissolve (be eliminated). FIG. 5 is a correlation diagram illustrating a relation of the surface roughness of the second electrode in EC element 110 according to the present embodiment with respect to a deposition voltage and a dissolution time. In FIG. 5, the horizontal axis represents arithmetic surface roughness Ra [μm] of second electrode 114, whereas the vertical axes represent a voltage [V] and a dissolution time [sec] for thin metal film 118 formed on first electrode 113 to dissolve.

As illustrated in FIG. 5, although also illustrated in FIG. 4, the second deposition voltage is increased by increasing arithmetic surface roughness Ra of second electrode 114. At this time, there is no considerable change in the first deposition voltage. Accordingly, to dissolve thin metal film 118 deposited on first electrode 113, driver 120 can apply the highest voltage in a range in which metal 117 is not deposited on second electrode 114. Thus, driver 120 can apply a voltage slightly lower than the second deposition voltage, between first electrode 113 and second electrode 114 as the second voltage.

The higher the second voltage is, the more readily capture of electrons from thin metal film 118 on first electrode 113 is facilitated, so that metal 117 is further readily ionized (dissolved). Accordingly, thin metal film 118 formed on first electrode 113 can be dissolved in a short time period, while disallowing metal 117 to be deposited on second electrode 114.

A dissolution time for thin metal film 118 illustrated in FIG. 5 to dissolve is a time it takes to dissolve (eliminate) thin metal film 118 when the above highest voltage is applied as the second voltage. Specifically, the dissolution time in FIG. 5 is a time it takes for thin metal film 118 formed on first electrode 113 whose reflectance has reached 70% or more to have a reflectance of 20% or less, after operation for the dissolution has started.

As a result, a potential difference between the first deposition voltage and the second deposition voltage can be increased by increasing arithmetic surface roughness Ra of second electrode 114. Accordingly, in order to dissolve thin metal film 118, a high voltage within a range in which metal 117 is not deposited on second electrode 114 can be applied between first electrode 113 and second electrode 114, and thus the speed at which thin metal film 118 is dissolved can be increased.

Figure 6:
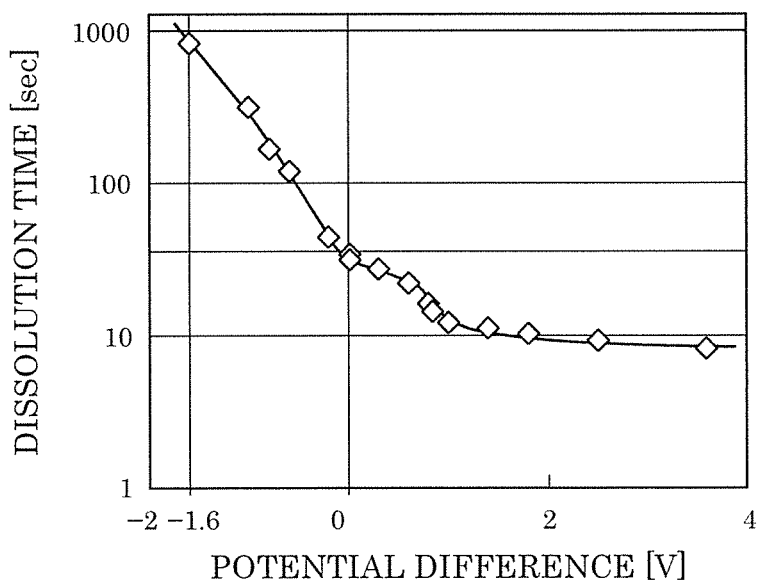
FIG. 6 is a correlation diagram illustrating a relation between a voltage difference and a dissolution time in the electrochromic element according to the embodiment.

FIG. 6 is a correlation diagram illustrating a relation between a voltage difference (potential difference) and a dissolution time in EC element 110 according to the present embodiment. In FIG. 6, the horizontal axis represents a potential difference [V] between first electrode 113 and second electrode 114, and the vertical axis represents the dissolution time [sec] for thin metal film 118 formed on first electrode 113 to dissolve.

At this time, the dissolution time for thin metal film 118 to dissolve is measured when the voltage at first electrode 113 is set to 0 V (ground level) and a negative voltage is applied to second electrode 114. Accordingly, the potential difference illustrated in FIG. 6 is a value obtained by subtracting the first deposition voltage (here, +1.6 V) from the absolute value of the negative voltage applied to second electrode 114 (namely, the second voltage). Note that in the following, the potential difference illustrated in FIG. 6 is stated as a "potential difference", so as to be distinguished from a general potential difference.

The case where the "potential difference" is −1.6 V is when the potential difference between first electrode 113 and second electrode 114 is 0, and indicates that the applied voltage between the electrodes is 0 V. When the "potential difference" is greater than −1.6 V, a voltage (namely, the second voltage) is applied so that first electrode 113 is an anode and second electrode 114 is a cathode. In a range in which the "potential difference" is 0 to 1.6 V, a voltage whose absolute value is smaller than the absolute value of the first deposition voltage is applied as the second voltage.

As illustrated in FIG. 6, when the "potential difference" is negative (the voltage applied to second electrode 114 is 0 to a value greater than −1.6 V), the dissolution time abruptly decreases as the "potential difference" approaches 0 V. However, even if a voltage of −1.6 V is applied to second electrode 114 (stated differently, even if the "potential difference" illustrated in FIG. 6 is 0 V", the dissolution of thin metal film 118 takes 10 minutes or more.

The dissolution time is once stabilized at the "potential difference" of or around 0 V. The dissolution time is gradually stabilized when the "potential difference" is 1 V or higher (a voltage applied to second electrode 114 is −2.6 V or smaller).

From the above, for example, arithmetic surface roughness Ra of second electrode 114 is set to 0.03 µm or higher when the "potential difference" is provided by surface roughness, according to the results illustrated in FIGS. 4 to 6. Accordingly, the speed at which metal 117 dissolves can be greatly improved. Furthermore, the transparency of second electrode 114 can be secured by setting arithmetic surface roughness Ra of second electrode 114 to 0.04 µm or less.

[3-1-2. Crystal Fine Particles]

The following describes crystal fine particles 114*a* used to roughen the surface of second electrode 114.

Figure 7:
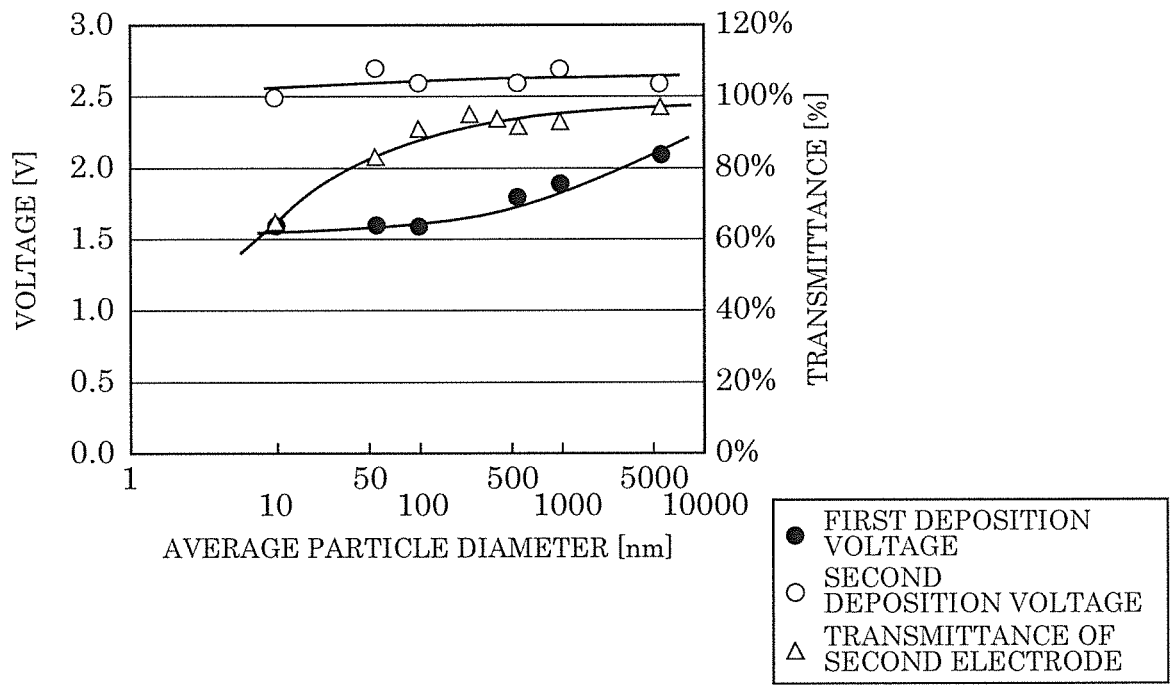
FIG. 7 is a correlation diagram illustrating a relation of an average particle diameter of particles which modify the second electrode of the electrochromic element according to the embodiment with respect to a deposition voltage and a transmittance.

FIG. 7 is a correlation diagram illustrating a relation of the average particle diameter of particles which modify second electrode 114 of EC element 110 according to the present embodiment with respect to a deposition voltage and transmittance. Here, as illustrated in FIG. 7, the particle diameter of crystal fine particles 114*a* used to roughen the surface is changed to 10 nm, 50 nm, 500 nm, 1 µm, and 5 µm, and a similar experiment to the case in FIG. 4 is conducted. In FIG. 7, the horizontal axis represents an average particle diameter [nm] of crystal fine particles 114*a* used to roughen second electrode 114, and the vertical axes represent the voltage [V] and transmittance [%]. At this time, arithmetic surface roughness Ra is adjusted to 0.04 µm.

As can be seen from FIG. 7, the difference in particle diameter of crystal fine particles 114*a* does not influence the second deposition voltage. Furthermore, it can be seen that if the average particle diameter is increased, the transmittance of second electrode 114 improves. Specifically, transmittance of second electrode 114 abruptly increases when the average particle diameter is in a range from 10 nm to 100 nm, and reaches 90% or higher and is saturated when the average particle diameter is 500 nm or more.

In contrast, the first deposition voltage increases with an increase in the average particle diameter. Specifically, the first deposition voltage is substantially constant in a range in which the average particle diameter is 10 nm to 100 nm, but gradually increases when the average particle diameter is 500 nm or more.

From the above, a potential difference between the first deposition voltage and the second deposition voltage can be secured by setting the average particle diameter of crystal fine particles 114*a* to 500 nm or less. Furthermore, the transparency of second electrode 114 can be secured by setting the average particle diameter of crystal fine particles 114*a* to 50 nm or more. Accordingly, by setting the average particle diameter to be in a range from 50 nm to 500 nm, a potential difference between the first deposition voltage and the second deposition voltage and the transparency of second electrode 114 can be secured, while securing necessary surface roughness.

Note that a method of scraping the surface of the electrode may be used as the method of roughening the surface of second electrode 114, other than the method in which crystal fine particles 114*a* are used as stated above. Specifically, irregularity may be provided in the surface of the deposited conducting film, by sandblasting or glass bead blasting. Note that in this case, when the thickness of the conducting film is excessively thin, a distribution of resistance in the electrode may change due to partially scraping the surface. Accordingly, by securing at least a certain thickness of the conducting film, the surface of the electrode can be roughened appropriately while achieving a uniform distribution of resistance on the surface of the electrode.

Although the surface roughness of second electrode 114 is changed in the above method, first electrode 113 and second electrode 114 may be given different surface roughness by flattening (smoothing) first electrode 113, and a potential difference between the first deposition voltage and the second deposition voltage may be provided. Furthermore, a measure for increasing in-plane uniformity by changing surface roughness within the plane may be taken.

Generally, when a transparent electrode is used, the peripheral portion of the transparent electrode and/or a portion near a joint to which a voltage is applied are/is thicker, and a portion far from a center portion and the joint are thinner. Accordingly, the surface of the peripheral potion and the surface of the portion far from the joint may be roughened in order to make the speed of dissolution at an electrode constant.

[3-1-3. Nonconductor]

Figure 8:
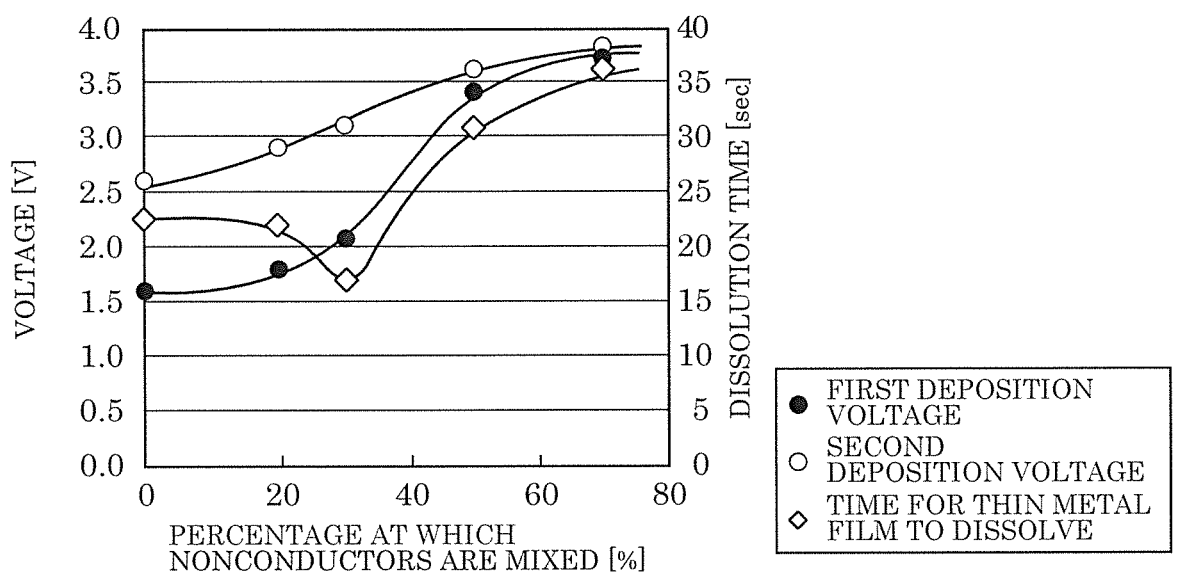
FIG. 8 is a correlation diagram illustrating a relation of a percentage at which particulate nonconductors which modify the second electrode of the electrochromic element according to the embodiment are mixed with respect to a deposition voltage and a dissolution time.

The following describes the case where nonconductors 114b are mixed with crystal fine particles (electric conductors) 114a and applied when crystal fine particles 114a are to be applied onto second electrode 114, with reference to FIG. 8. FIG. 8 is a correlation diagram illustrating a relation of a percentage at which nonconductors 114b are mixed in particles which modify second electrode 114 of EC element 110 according to the present embodiment with respect to a deposition voltage and a dissolution time. In FIG. 8, the horizontal axis represents a mixing percentage [%, molar ratio] at which nonconductors 114b are mixed, whereas the vertical axes represent the voltage [V] and the dissolution time [sec] for thin metal film 118 to dissolve.

Here, nonconductors 114b having the same particle diameter as that of crystal fine particles 114a are mixed in an aggregate of crystal fine particles 114a which are electric conductors. Nonconductors 114b are particulate crystal fine particles made of an insulating material. Zinc oxide is used for nonconductors 114b, yet glass beads or a metal oxide such as zirconium (Zr), aluminum (Al), or magnesium (Mg), for example, may be used. Note that in FIG. 8, the particle diameters of crystal fine particles 114a and nonconductors 114b are 100 nm. Note that mixing nonconductors 114b can make the electric resistance of second electrode 114 higher than the electric resistance of first electrode 113.

As illustrated in FIG. 8, if the mixing percentage at which nonconductors 114b are mixed is increased, the second deposition voltage increases. However, the first deposition voltage also increases with an increase in the second deposition voltage. The first deposition voltage abruptly increases when the mixing percentage at which nonconductors 114b are mixed is 30% or higher.

FIG. 8 also illustrates a dissolution time for thin metal film 118 to dissolve. The dissolution time is measured in the same manner as the dissolution time illustrated in FIG. 5. As can be seen from FIG. 8, the dissolution time is short when the mixing percentage at which nonconductors 114b are mixed is 30%. When the mixing percentage at which nonconductors 114b are mixed is 30%, a potential difference between the first deposition voltage and the second deposition voltage is substantially the greatest, so that the second voltage having a large absolute value can be applied. Accordingly, the speed of dissolution of thin metal film 118 increases, and the dissolution time is shortened.

From the above, for example, a potential difference can be secured by setting the mixing percentage at which nonconductors 114b are mixed to 40% or less. For example, the dissolution time can be sufficiently shortened by setting the mixing percentage at which nonconductors 114b are mixed to 30%.

[3-2. Electrode Pattern]

Figure 9:
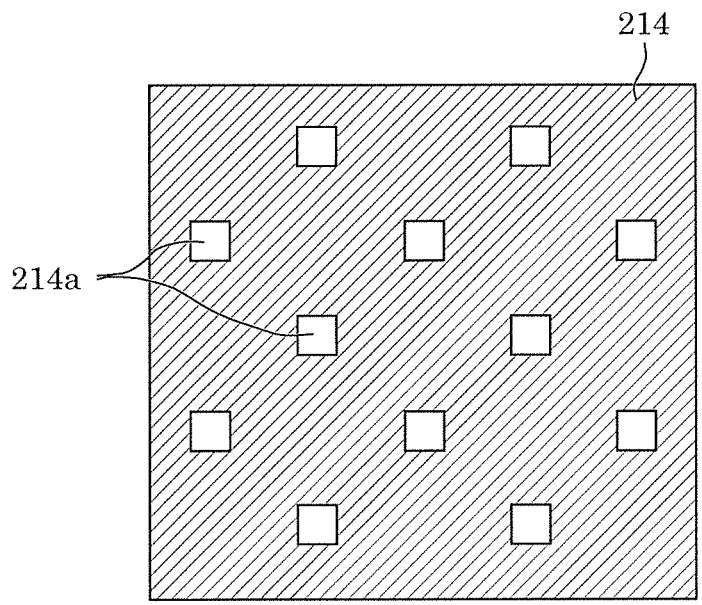
FIG. 9 is a plan view of a second electrode of an electrochromic element according to a variation of the embodiment.
Figure 10:
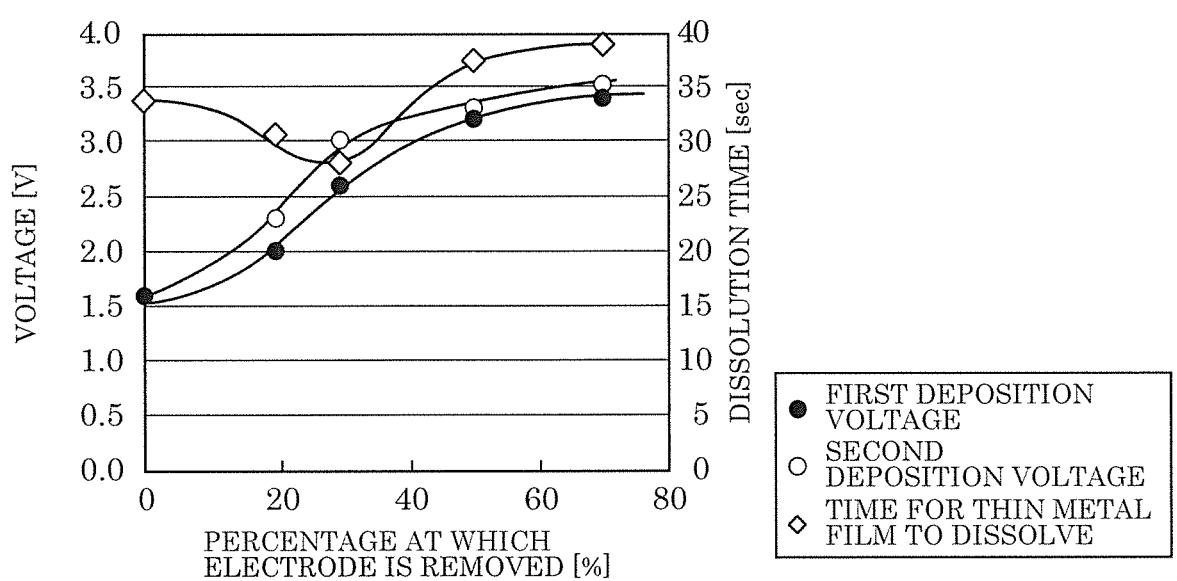
FIG. 10 is a correlation diagram illustrating a relation of a percentage at which the second electrode of the electrochromic element according to the embodiment is removed with respect to a deposition voltage and a dissolution time.

The following describes the case where a pattern (the shape in a plan view) of second electrode 114 is changed with reference to FIGS. 9 and 10. FIG. 9 is a plan view of second electrode 214 of an EC element according to a variation of the present embodiment. FIG. 10 is a correlation diagram illustrating a relation of a reduction percentage at which second electrode 214 of the EC element is reduced with respect to a deposition voltage and a dissolution time in the variation of the present embodiment. Note that the pattern of second electrode 214 is intended to increase the electric resistance of second electrode 214 similarly to the above.

Here, second electrode 214 illustrated in FIG. 9 is formed by processing second electrode 114. Specifically, portions in which the electrode is not present, that is, through holes 214a are provided in second electrode 114 while maintaining the contour of second electrode 114.

Through holes 214a pass through second electrode 214 in the thickness direction. The shape of through holes 214a in a plan view is, for example, square or rectangular, but is not limited thereto and may be round. As illustrated in FIG. 9, plural through holes 214a are provided in second electrode 214. Plural through holes 214a are disposed randomly or at an equal distance to each other so that distribution of through holes 214a in the surface is substantially uniform.

Note that the pattern of second electrode 214 as illustrated in FIG. 9 is formed by forming second electrode 214 through several depositions with masks thereon. Alternatively, after depositing second electrode 214 on the entire surface, through holes 214a can be formed by partially removing the deposited conducting film using photolithography and etching. At this time, there is a step between a portion in which the conducting film is present and a portion in which the conducting film is not present. Such a step can be avoided by depositing, for example, the conducting film in a state of being rotated using an eccentric holder.

The pattern of the electrode is not limited to the pattern illustrated in FIG. 9, and the electric resistance of the electrode may be changed using a hounds-tooth pattern or by the thickness of the deposited film as mentioned above.

The correlation diagram illustrated in FIG. 10 shows the results of experiments conducted using second electrodes 214 having through holes 214a whose surface areas constitute different percentages in a plan view. Note that second electrode 214 is partially removed in a uniform manner within a plane.

In FIG. 10, the horizontal axis represents a reduction percentage [%] of second electrode 214, whereas the vertical axes represent a voltage [V] and a dissolution time [sec] for thin metal film 118 to dissolve. As can be seen from FIG. 10, there is a potential difference between the first deposition voltage and the second deposition voltage when the reduction percentage of second electrode 214 is in a range from about 20% to about 30%. Accordingly, it can be seen that the dissolution time for thin metal film 118 to dissolve is also shortened.

Note that as shown by the above results, the reduction percentage at which second electrode 214 is reduced is important, and the shape of a portion in which second electrode 214 is not present (that is, through hole 214a) does not greatly influence. Note that when a current path is excessively limited by providing plural through holes 214a at one location in a concentrated manner, deposition and dissolution of thin metal film 118 as a whole are influenced. Accordingly, plural through holes 214a are provided in a substantially uniform manner within a plane, thus inhibiting such influences.

As described above, thin metal film 118 can be efficiently deposited and dissolved by changing the pattern (shape in a plan view) of second electrode 214.

[3-3. Temperature]

Figure 11:
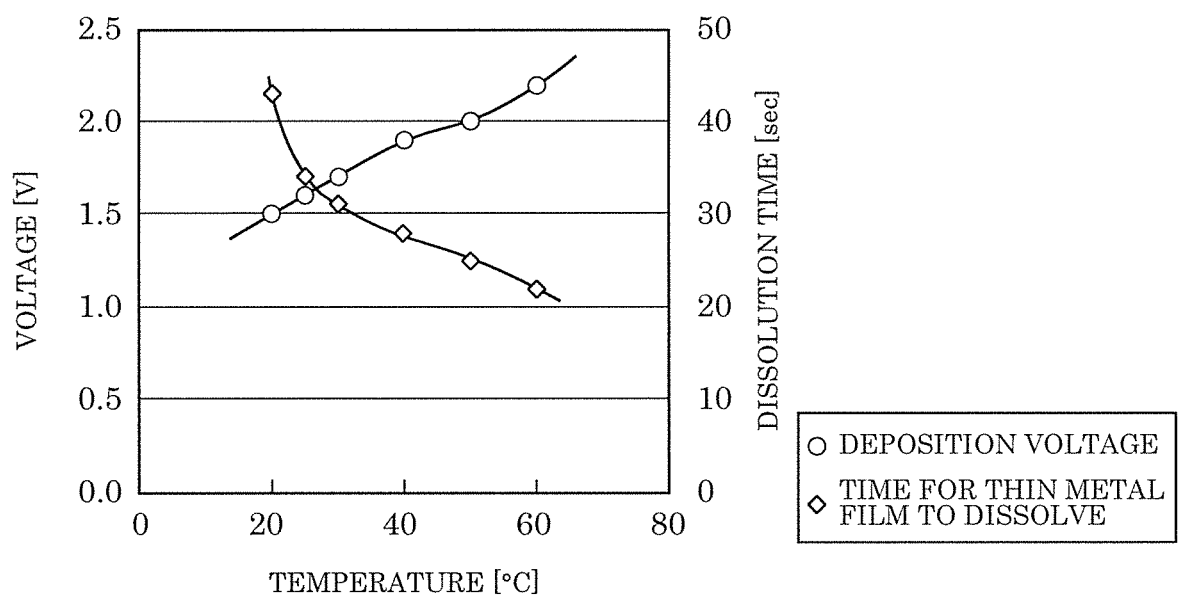
FIG. 11 is a correlation diagram illustrating a relation of a temperature of the electrochromic element according to the embodiment with respect to a deposition voltage and a dissolution time.

The following describes the result of experiments conducted with the temperature of EC element 110 being focused on, with reference to FIG. 11. FIG. 11 is a correlation diagram illustrating a relation of the temperature of EC element 110 according to the present embodiment with respect to a deposition voltage and a dissolution time. In FIG. 11, the horizontal axis represents the temperature of EC element 110, whereas the vertical axes represent a voltage [V] and a dissolution time [sec] for thin metal film 118 to dissolve.

As can be seen from FIG. 11, the deposition voltage increases and a dissolution time for thin metal film 118 to dissolve decreases, with an increase in the temperature of EC element 110. Accordingly, the first deposition voltage can be decreased by increasing the temperature of first electrode 113 that is on the side where thin metal film 118 is deposited and dissolved. Accordingly, a greater potential difference can be given between the first deposition voltage and the second deposition voltage, and the speed of dissolution can be improved.

On the contrary, the second deposition voltage can be increased by lowering the temperature of second electrode 114 that is on the side where thin metal film 118 is not deposited and dissolved. Accordingly, the second voltage applied to second electrode 114 when dissolving thin metal film 118 can be increased, and thus the speed of dissolution can be improved.

Note that a time taken to dissolve thin metal film 118 is longer and more dominant than a time taken to deposit metal 117. Accordingly, when the present disclosure is used in combination with a display device like a smart mirror (which will be later described in detail), for instance, a normal operation may be performed to deposit metal 117, whereas the temperature of first electrode 113 may be increased by intentionally turning on the back light of a liquid crystal display to dissolve thin metal film 118. Advantageous effects of time reduction can be expected by starting the dissolution after the temperature has increased to some extent.

[4. Example of Use]

The following describes a specific example of use of EC device 100 having the configuration as described above. When in the light-shielding state, EC element 110 according to the present embodiment is allowed to have a transmittance of 0.1% or less, and can secure a reflectance of 80% if deposited metal 117 is light-reflective metal. Accordingly, for example, the present disclosure is applicable to various usages, such as smart mirrors, smart windows (such as windows as building material, and garret windows), and sunroofs of vehicles.

[4-1. Smart Mirror]

Figure 12:
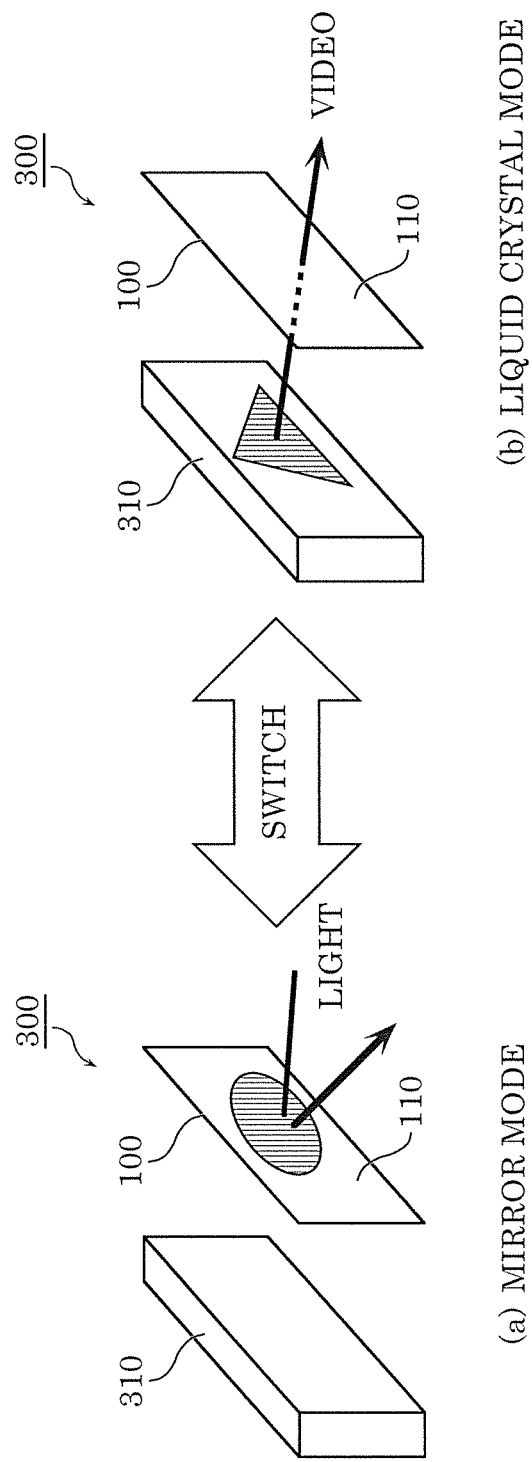
FIG. 12 is a conceptual diagram illustrating a smart mirror in the embodiment.

For example, EC device 100 can be used for smart mirror 300 as illustrated in FIG. 12. FIG. 12 is a conceptual diagram of smart mirror 300 according to the present embodiment.

Smart mirror 300 illustrated in FIG. 12 is, for example, a rearview mirror of a vehicle, such as a driving mirror. Smart mirror 300 is a device which displays, on a display disposed at the position of a rearview mirror, a video captured by a camera attached to the rear of the vehicle so as to substitute for the rearview mirror, and also switches between the substituted rearview mirror and a normal mirror.

Smart mirror 300 includes EC device 100 and display device 310 as illustrated in FIG. 12. EC element 110 of EC device 100 is disposed in front of display device 310 (that is, on the display surface side).

For example, EC element 110 of EC device 100 can deposit silver as thin metal film 118, and second electrode 114 is transparent. EC element 110 can switch between the transparent state and the reflective state according to an applied electric field.

Display device 310 is a flat display such as a liquid crystal display (LCD) or an organic electroluminescent (EL) display.

It is assumed that a user looks at smart mirror 300 from the EC device 100 side. Smart mirror 300 can operate in two modes, namely, a mirror mode and a liquid crystal mode.

As illustrated in (a) of FIG. 12, EC element 110 is in the reflective state when in the mirror mode, and thus reflects light on the surface thereof, thus functioning as a mirror. At this time, even if display device 310 is displaying contents such as an image or a video (for example, a video of the back of the vehicle), EC element 110 blocks the image (video). Accordingly, the user cannot see the image or the video displayed on display device 310.

As illustrated in (b) of FIG. 12, EC element 110 is in the transparent state when in the liquid crystal mode, and display device 310 displays contents such as an image or a video. EC element 110 transmits light, and thus the user can see contents displayed by display device 310, as it is.

Note that the modes of smart mirror 300 can be switched according to a user operation or the contents of the image (video).

[4-2. Smart Glasses]

The following describes an example of application to smart glasses.

Smart glasses display a video on a glass portion of the glasses, using a display device or a very small projector, and are progressively developed in order to give work instructions or guidance. However, the smart glasses are extremely susceptible to the influence of natural light, and thus it is difficult to secure contrast that can be perceived by human vision.

The influence of natural light can be reduced by applying EC device 100 according to the present embodiment to the smart glasses.

Figure 13:
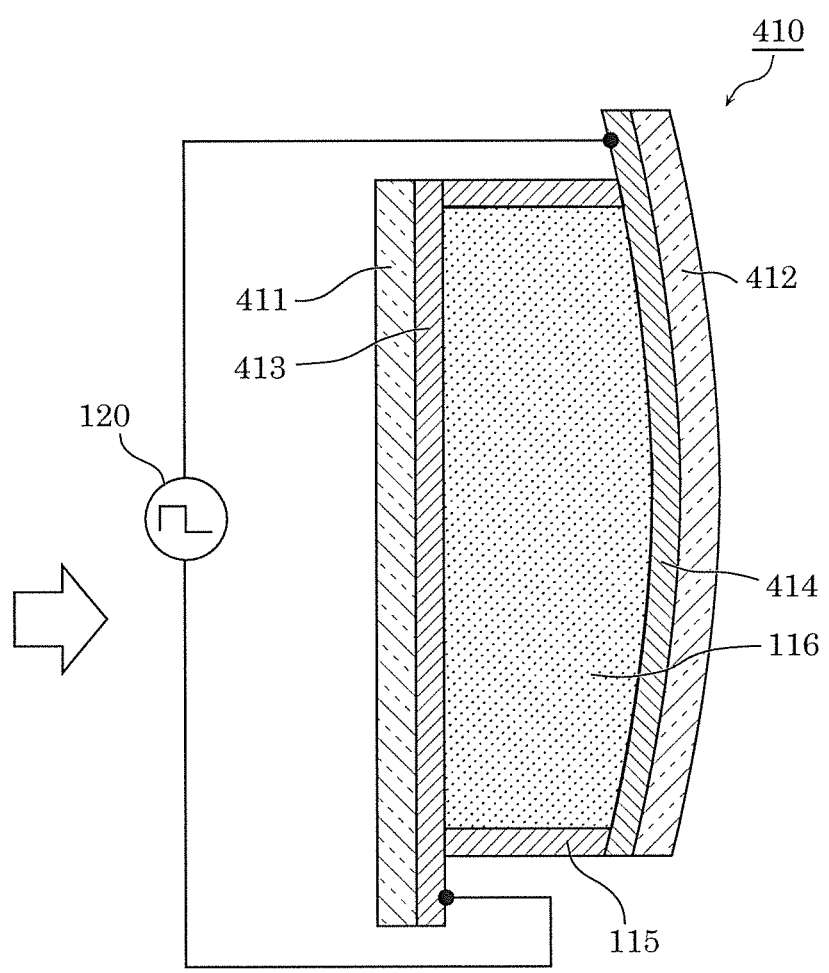
FIG. 13 is a cross-sectional view of the electrochromic element applied to smart glasses in the embodiment.

FIG. 13 is a cross-sectional view of EC element 410 applied to the smart glasses in the present embodiment. As illustrated in FIG. 13, EC element 410 includes first substrate 411, second substrate 412, first electrode 413, and second electrode 414, instead of first substrate 111, second substrate 112, first electrode 113, and second electrode 114, as compared with EC element 110 illustrated in FIG. 3. Note that although not illustrated in FIG. 13, a display device such as an LCD is disposed on the second substrate 412 side (which is farther from the user's eyes).

EC element 410 has a different surface shape from that of EC element 110 so as to be used for the lens part of the smart glasses. Specifically, first substrate 411, second substrate 412, first electrode 413, and second electrode 414 are concave when viewed in the user's viewing direction (the direction indicated by the outline arrow illustrated in FIG. 13). In order to clearly show the difference of the shapes here, first substrate 411 and first electrode 413 are illustrated as being substantially flat.

Specifically, first substrate 411 and first electrode 413 are formed into a convex shape toward second electrode 414 and second substrate 412. Specifically, the surface of first electrode 413 which faces the second electrode 414 (that is, the surface in contact with electrolyte 116) is convex.

Second substrate 412 and second electrode 414 are formed into a concave shape that is recessed so as to be further away from first electrode 413 and first substrate 411. Specifically, the surface of second electrode 414 which faces first electrode 413 (that is, a surface in contact with electrolyte 116) is a concave surface.

Here, the surface of first electrode 413 and the surface of second electrode 414 have different curvatures. Specifically, the curvature of second electrode 414 is smaller than the curvature of first electrode 413. Thus, the surface area of second electrode 414 is larger than the surface area of first electrode 413.

As a result, the surface area of second electrode 414 can be increased while maintaining the effective area (the area perpendicular to an electric field), by adopting such a configuration. Accordingly, due to an increase in the surface area of second electrode 414, a voltage to be applied to deposit metal 117 increases. Accordingly, an increase in the speed of dissolution of metal 117 (thin metal film 118) can be expected.

As long as the curvature radius of first electrode 413 and first substrate 411 is greater than the curvature radius of second electrode 414 and second substrate 412, first electrode 413 and first substrate 411 may be flat (have an infinite curvature radius) as shown in FIG. 13 or may be curved. Note that the smaller the curvature radius of second electrode 414 is, the more advantageous effects of improving the speed of dissolution tend to be yielded.

Note that when the present disclosure is applied to smart glasses, not the entire lens of glasses, but a portion of the lens may be used as the EC device, and only one lens on either the right or left side may be used as the EC device.

Note that when the present disclosure is used for a smart window or a window such as a sunroof of a vehicle, while thermally insulating effects can be yielded by depositing metal 117 so as to achieve the light-shielding state, the window can also be used as a normal window when in the transparent state.

[5. Conclusion]

As described above, EC element 110 according to the present embodiment includes: first electrode 113 which transmits light; second electrode 114 disposed opposite first electrode 113; and electrolyte 116 containing metal 117 and located between first electrode 113 and second electrode 114. Metal 117 is depositable on one of first electrode 113 and second electrode 114, according to a voltage applied between first electrode 113 and second electrode 114, and a second deposition voltage at which deposition of metal 117 on second electrode 114 starts is higher than a first deposition voltage at which deposition of metal 117 on first electrode 113 starts.

Accordingly, the second deposition voltage is higher than the first deposition voltage, and thus the absolute value of the voltage (the second voltage) applied to dissolve metal 117 can be increased. Specifically, a voltage slightly lower than the second deposition voltage can be applied as the second voltage, and thus electrons can be efficiently taken from metal 117 (thin metal film 118) deposited on first electrode 113. Accordingly, metal 117 can be efficiently dissolved (ionized).

Further, the first deposition voltage is lower than the second deposition voltage, and thus a voltage (the first voltage) applied to deposit metal 117 may be low. Accordingly, metal 117 can be efficiently deposited also at a low voltage. Accordingly, power consumption can also be reduced.

Accordingly, metal 117 can be efficiently deposited and dissolved, and thus the transparent state and the reflective state (or the light-shielding state) can be switched in a short time. Thus, for example, the transparent mode and the liquid crystal mode can be smoothly switched if the present disclosure is used for, for instance, smart mirror 300 as mentioned above.

For example, second electrode 114 has a surface rougher than a surface of first electrode 113.

Accordingly, the higher surface roughness of second electrode 114 can make the second deposition voltage higher than the first deposition voltage. Accordingly, for example, even if first electrode 113 and second electrode 114 are formed using the same material, the second deposition voltage can be made higher than the first deposition voltage. Accordingly, first electrode 113 and second electrode 114 can be given substantially the same optical properties, and thus transmittance of light can be increased in particular when in the transparent state, for instance. In addition, various electrode materials can be selected, so that an inexpensive material can also be used, and thus manufacturing cost can be reduced.

For example, second electrode 114 has an electric resistance higher than the electric resistance of first electrode 113.

Accordingly, since the electric resistance (resistibility) of second electrode 114 is higher, the second deposition voltage can be made higher than the first deposition voltage. Accordingly, for example, even if first electrode 113 and second electrode 114 have the same structure, the second deposition voltage can be readily made higher than the first deposition voltage by using materials having different electric resistances.

For example, second electrode 114 includes particulate nonconductors.

Accordingly, the electric resistance of second electrode 114 can be readily increased by including nonconductors 114b. At this time, electric resistance can be adjusted by adjusting the content of nonconductors 114b, and thus a potential difference between the second deposition voltage and the first deposition voltage can also be readily adjusted.

For example, EC element 110 may include second electrode 214 illustrated in FIG. 9, instead of second electrode 114. Second electrode 214 has through hole 214a that passes through second electrode 214 in a thickness direction.

Accordingly, the electric resistance of second electrode 114 can be readily increased by providing through hole 214a. At this time, the electric resistance can be adjusted by adjusting the content of nonconductors 114b, and thus a potential difference between the second deposition voltage and the first deposition voltage can also be readily adjusted.

For example, EC device 100 may include EC element 410 illustrated in FIG. 13, instead of EC element 110. A surface of second electrode 414 that faces first electrode 413 is concave.

Accordingly, the surface area of electrode 414 can be increased. The electric resistance of second electrode 114 can be increased due to an increase in the surface area, and the second deposition voltage can be made higher than the first deposition voltage.

For example, metal 117 is a noble metal. At this time, for example, the noble metal is one of silver, gold, platinum, and palladium.

Accordingly, noble metals have lower ionization tendency, and thus metal 117 can be stably deposited as thin metal film 118 when an electric field is applied to electrolyte 116.

EC device 100 according to the present embodiment includes: electrochromic element 110; and driver 120 which applies a voltage between first electrode 113 and second electrode 114.

Accordingly, the optical state of EC element 110 can be changed by a voltage applied to first electrode 113 and second electrode 114.

For example, driver 120 applies a first voltage between first electrode 113 and second electrode 114 to deposit metal 117 on first electrode 113, and driver 120 applies a second voltage having an absolute value greater than an absolute value of the first voltage and a polarity reverse to a polarity of the first voltage, to dissolve metal 117 deposited on first electrode 113, Accordingly, the second voltage applied to dissolve metal 117 can be increased, and thus electrons can be efficiently taken from metal 117 (thin metal film 118) deposited on first electrode 113. Accordingly, metal 117 can be efficiently dissolved (ionized).

Other Embodiments

The above embodiments have been described as examples of the technology disclosed in the present application. However, technology according to the present disclosure is not limited to this, and can be applied also to an embodiment on which modification, replacement, addition, and omission, for instance, have been performed. Furthermore, elements described in the above embodiment can be combined to achieve a new embodiment.

Thus, other embodiments are exemplified in the following.

For example, the above embodiment has described an example in which the same conductive material is used for first electrode 113 and second electrode 114, and first electrode 113 and second electrode 114 have different surface roughness or different electrode patterns, whereby the second deposition voltage is made higher than the first deposition voltage, but the present disclosure is not limited to this. First electrode 113 and second electrode 114 may have the same surface roughness. For example, the second deposition voltage may be made higher than the first deposition voltage by forming first electrode 113 and second electrode 114 using different conductive materials.

For example, the above embodiment has described an example in which the surface of second electrode 114 includes nonconductors 114b, yet the present disclosure is not limited thereto. Nonconductors 114b may be dispersed in the layer of second electrode 114 in a substantially uniform manner not only on the surface, but also in the thickness direction.

For example, second electrode 214 may include recesses, instead of through holes 214a. In other words, second electrode 214 may partially include thin portions.

The above has described the embodiments as examples of the technology in the present disclosure. For the description, the accompanying drawings and the detailed description are provided.

Thus, the elements illustrated in the accompanying drawings and described in the detailed description may include not only elements necessary for addressing the problem, but also elements not necessarily required for addressing the problem, in order to illustrate the above technology. Accordingly, a mere fact that such unnecessarily required elements are illustrated in the accompanying drawings and described in the detailed description should not immediately lead to a determination that such unnecessarily required elements are required.

In addition, the embodiments described above are intended to illustrate the technology according to the present disclosure, and thus various modifications, replacement, addition, and omission, for instance, can be performed within the scope of claims and equivalent thereof.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

Since the present disclosure allows metal to be efficiently deposited and dissolved, the present disclosure is applicable to devices whose optical states can be changed, such as smart mirrors, smart glasses, and smart windows.

What is claimed is:

1. An electrochromic device, comprising:
a first electrode which transmits light;
a second electrode disposed opposite the first electrode;
an electrolyte containing metal and located between the first electrode and the second electrode; and
a driver which applies a first voltage and a second voltage between the first electrode and the second electrode, wherein
the metal is depositable on one of the first electrode and the second electrode,
a second deposition voltage at which deposition of the metal on the second electrode starts is higher than a first deposition voltage at which deposition of the metal on the first electrode starts,
the second electrode has an electric resistance higher than an electric resistance of the first electrode,
the driver applies the first voltage between the first electrode and the second electrode to deposit the metal on the first electrode, and
the driver applies the second voltage between the first electrode and the second electrode such that (i) the metal deposited on the first electrode is dissolved and (ii) no metal is deposited on the second electrode, the second voltage having an absolute value greater than an absolute value of the first voltage and lower than the second deposition voltage, and the second voltage having a polarity reverse to a polarity of the first voltage.

2. The electrochromic device according to claim 1, wherein a surface of the second electrode that faces the first electrode is concave.

3. The electrochromic device according to claim 1, wherein the metal is a noble metal.

4. The electrochromic device according to claim 3, wherein the noble metal is one of silver, gold, platinum, and palladium.

* * * * *